Feb. 1, 1938. E. T. BURTON 2,106,793

FILTER INCLUDING SPACE DISCHARGE DEVICE

Filed Dec. 26, 1934

INVENTOR
E. T. BURTON
BY
ATTORNEY

Patented Feb. 1, 1938

2,106,793

UNITED STATES PATENT OFFICE 2,106,793

FILTER INCLUDING SPACE DISCHARGE DEVICE

Everett T. Burton, Millburn, N. J., assignor to Bell Telephone Laboratories, Incorporated, New York, N. Y., a corporation of New York Application December 26, 1934, Serial No. 759,172

8 Claims. (Cl. 178—44)

The present invention relates to the suppression of undesired current or voltage variations in an electrical circuit, and will be described in one of its aspects as embodied by way of example, in a power supply circuit for space discharge tubes. The invention is applicable, however, to situations generally in which impulses are to be filtered or suppressed, the invention making possible the practically total elimination of undesired impulses or wave components from a circuit.

In a plate voltage supply circuit for a multi-stage amplifier, it is customary to use the same rectifier and filter for the tubes of successive stages and to filter more thoroughly the current for the earlier stages than that for the later stages. The fact that the relatively heavy current for the later or power stages flows through at least some of the filter impedances that also serve for the initial stages, is liable to give rise to undesired interaction between stages. A practical limit is set to the degree of filtering that can be accomplished by ordinary means on account of the size of inductances and capacities that can be used in given situations.

The present invention gives as high a degree of elimination as may be required of the variations coming from the power supply and also reduces the undesired interaction between stages arising from the use of the same filtering impedances by the tubes of different stages. This is accomplished by use of a space discharge tube as a suppressor or compensator device, preferably a tube having a control element or grid, so related to the circuit as to vary the internal impedance of the tube under control of voltage fluctuations to be reduced.

Specifically, the tube is used as a shunt filtering element and the grid receives controlling variations from both the power circuit and from the load circuit or circuits from which fluctuations may arise.

More generically, the invention relates to the use of a space discharge device incorporated in a filter capable of filtering currents of any frequency and adapted to general use for filtering purposes.

The nature of the invention, its mode of operation and its various objects and features will be made clear from the following detailed description in view of the accompanying drawing.

Figure 1:
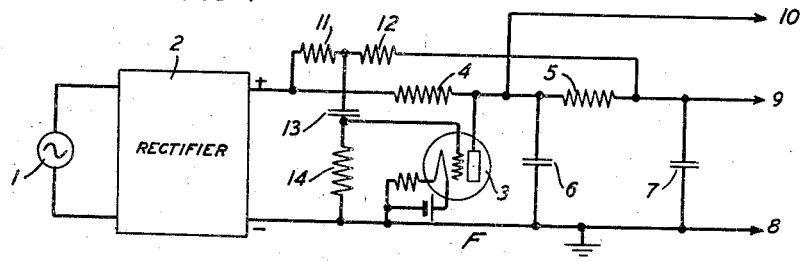
Figure 2:
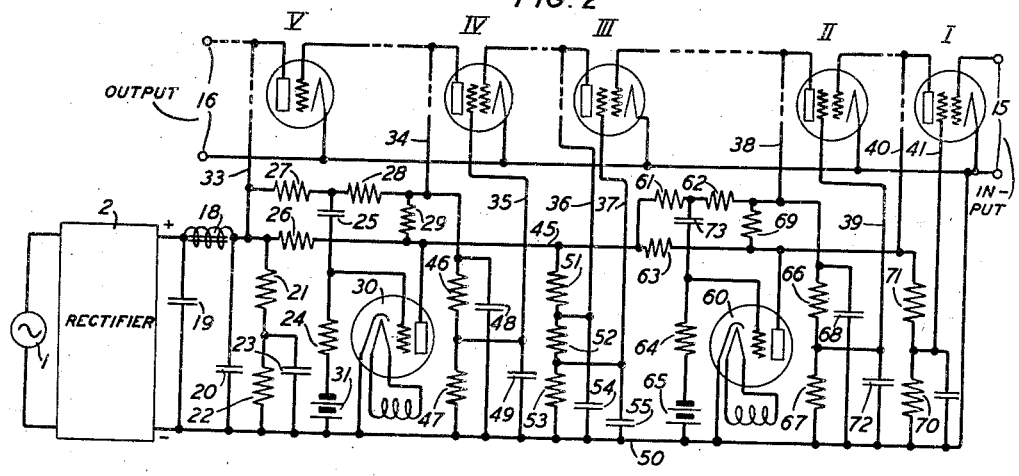

In the drawing, Fig 1 is a schematic diagram of a power current filtering system in accordance with the invention;

Fig. 2 is a schematic circuit diagram of a power supply and filtering system for a multi-stage amplifier in accordance with the invention; and Figs. 3, 4, 5 and 6 show modified types of filtering circuits in accordance with the invention.

Referring first to Fig. 1, a source 1 of alternating current of any suitable type, such as a commercial lighting circuit outlet, is shown connected through a rectifier 2 to a filtering circuit generally indicated by F. The rectifier 2 may be a half-wave or full-wave rectifier of any suitable type. The filter F is shown as comprising usual elements such as series inductances 4 and 5 and shunt condensers 6 and 7. The output terminals of the filter may lead to suitable load circuits, one of which may be considered to be connected between terminals 8 and 9 and the other between terminals 8 and 10. The load connected between terminals 8 and 10 will receive more thoroughly filtered current than that connected between terminals 8 and 9.

In accordance with this invention the filter F also includes a space discharge tube 3 having a cathode and anode shunted across the circuit and a grid suitably connected to control the impedance of the device 3 to aid in the filtering action. In the circuit of Fig. 1 the grid of the tube 3 is connected so as to be influenced by variable voltage appearing at either the input or the output of the filter F. For this purpose, the grid is connected through capacity 13 and high resistance 11 to a point on the input side of filter F and through capacity 13 and high resistance 12 to a point on the output side of the filter F. The grid also has a direct current connection through high resistance 14 to its cathode which is at the negative side of the line.

The output current from rectifier 2 comprises in addition to the direct current component, a large component of alternating currents of various frequencies resulting from the rectifying action of the alternating current from source 1. By the connection of the grid of tube 3 so as to be influenced by these alternating components of voltage, the impedance offered by tube 3 across the line in parallel with condenser 6 is varied in step with these variations in rectifier output current and in such phase relation that the tube 3 effectively absorbs these alternating components. For example, if the line voltage momentarily rises tending to send more current through the filter F, the instantaneous impedance of the tube 3 is lowered so that the tube shunts off more current from the line, the net effect being that less of the excess current is allowed to pass through the filter.

If the loads connected to the output of the filter draw variable current as, for example, in the case of the space current power supplied to a vacuum tube signaling system, there will be a tendency for variations in the current supplied to one load to influence harmfully the current supplied to the other load. For example, if the current drawn from terminal 9 is relatively large and variable and if it be desired to keep the current supplied to terminal 10 quite constant, it may be difficult to do this by the ordinary filtering means. In Fig. 1, however, the grid of tube 3 is influenced by any voltage changes occurring across the terminals 8 and 9 by virtue of its connection through resistance 12 to the terminal 9 and any tendency for the voltage to fluctuate across terminals 8 and 9 is counteracted by the variable shunt impedance offered by tube 3 in shunt of the line in response to the variations impressed upon its grid.

Referring to Fig. 2 the source 1 and rectifier 2 are connected to supply rectified power across a circuit comprising positive bus 45 and negative bus 50. Voltages are supplied in turn from this circuit to the tube elements of an amplifier comprising stages indicated as I, II, III, IV and V.

This amplifier has an input at 15 and an output at 16. The amplifier may comprise a part of a radio receiving or radio transmitting circuit or an audio amplifier or any other suitable circuit. For simplicity in the drawing, the interstage coupling circuits between the tubes as well as the input and output are not specifically shown, since these may vary widely to suit conditions and in and of themselves they form no part of the present invention. The presence in the circuit of suitable interstage arrangements is assumed, however, at the portions of the circuit indicated by dotted lines.

The filtering circuit included in the rectifier output circuit 45, 50 will be recognized as generally similar to that shown in Fig. 1 but in the case of Fig. 2 it comprises two stages of vacuum tube filtering, one stage being indicated as comprising vacuum tube 30 and the other as comprising vacuum tube 60. Since it is desirable to filter the currents supplied to the earlier stages of an amplifier more thoroughly than that supplied to the later stages, it will be noted that in Fig. 2 stages I and II receive their current and voltage supply from the second stage of the filtering circuit whereas the latter three stages of the amplifier are supplied from earlier points in the filtering system.

The plate current for the final tube of the amplifier is filtered by the series inductance 18 and shunt condensers 19 and 20. The cathodes of all of the amplifier tubes are connected to the minus bus 50. Inductance 18 is preferably large, for example, 16 henries, while condenser 19 may be, by way of example, 8 microfarads and condenser 20 may be 4 microfarads. There is some additional filtering to the space current for the last tube by the other elements of the circuit. For example, resistance 21 may be small relative to resistance 22 which is preferably of the order of .1 megohm while capacity 23 may be 4 microfarads.

Filter tube 30 has its cathode-anode circuit connected across the bus bars 50, 45 and its grid connected to its cathode through polarizing source 31 and resistance 24 of preferably the order of .1 megohm. This grid is also connected through a large capacity 25 to the junction of two resistances 27 and 28, each of which may be of the order of .1 megohm and which lead respectively to the anode supply conductors 33 and 34 for tubes V and IV. Resistance 26 is a filtering resistance in series in the bus 45 of relatively low value, for example 5000 ohms. Resistance 29 is in the series lead to the plate of stage IV and may be of the order of a few thousand ohms. Shunt resistors 46, 47 may each be of the order of a few thousand ohms while shunt condensers 48 and 49 may be 4 microfarad condensers. The screen of tube IV connects through lead wire 35 to the junction point of resistors 46 and 47 with a by-pass to ground through condenser 49, and is supplied with suitable direct current potential of a moderately high degree of filtering.

The impedance of filter tube 30 is affected principally by voltage variations appearing in lead 33 for the anode of tube V and lead 34 for the anode of stage IV and varies in shunt impedance in a way to compensate these variations. It is also influenced by variations in the screen potential appearing in lead 35 and aids in smoothing out these fluctuations.

The stage III has its anode lead 36 connected between resistors 51 and 52 to receive a positive voltage of suitable magnitude as determined by the value of the respective resistors 51, 52, 53, each of which may be of the order of a few thousand ohms. The screen of this tube is connected through lead 37 to the junction point of resistors 52 and 53. Shunt capacities 54 and 55 may be of the order of 4 microfarads. The voltages supplied to this stage are effectively filtered by the various resistances and impedances as well as by the tube 30. Any tendency for the relatively large fluctuations of current in the latter stages, such as V or IV, to react upon the stage III, is counteracted by the fact that the grid of the filter tube 30 is connected to receive and therefore to compensate fluctuations appearing in these portions of the circuit as was explained with the aid of the more simple diagram of Fig. 1.

The filtering tube 60 is connected in similar fashion to the filter tube 30 with its anode-cathode impedance connected across the busses 45, 50 and its grid connected to the negative bus 50 through resistance 64 and bias battery 65, and through condenser 73 to the resistance bridge comprising resistors 61 and 62. Space current is supplied to the anode of the second stage tube through series resistance 69 which may be of the order of 10,000 ohms and space current is supplied to the first stage through lead 40. Screen potential for stage II is supplied over conductor 39 from a point between resistances 66 and 67 (each of a few thousand ohms resistance) this combination being shunted by large capacities 68 and 72. Screen voltage for the first stage tube is obtained through conductor 41 from a point between resistors 70 and 71 of which resistor 71 is preferably of .1 megohm whereas resistance 70 is much smaller.

The voltage fluctuations across the bus bars 45 and 50 at the point of connection of resistances 61 and 63 are much smaller than those at the input of the first stage filter including tube 30. Filter tube 60 still further smooths out these fluctuations in a manner similar to that described above by virtue of the potential changes produced on the grid of the tube 60 in response to fluctuations developing on either side of the resistance bridge 61, 62.

Figure 3:
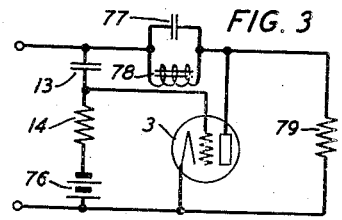

In Fig. 3 the tube 3 may have its impedance shunted across a line supplying from any suitable source not shown at the left of the figure, current which is to be filtered and supplied to a load represented in this case at 79. The grid circuit is supplied by bias potential from battery 76 through resistance 14 and is connected to the top side of the line through condenser 13. Between the points of connection of the grid and plate to the upper conductor of the line is included a filtering element which may comprise condenser 77 in parallel with inductance 78 either one of which may be omitted to suit conditions. For the purpose of suppressing ripple current the condenser 77 may be omitted. In other cases where it is desired to suppress a certain range of frequencies the combination of condenser and inductance 77 and 78 may be made anti-resonant at the frequency that is to be suppressed. For example, in a harmonic producing system this combination might be adjusted to suppress very completely the fundamental while transmitting the harmonics. The combination 77, 78 may, by proper construction or adjustment, produce a phase relation at certain frequencies such as to augment those frequencies.

Figure 4:
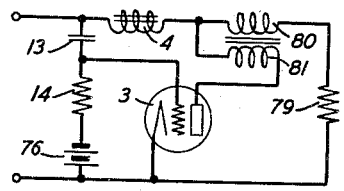

Fig. 4 shows an alternative circuit in which the plate circuit of the tube 3 is inductively connected to the load circuit through the transformer 80, 81. This circuit would be effective in those cases where the range of frequencies to be suppressed is not too wide. One advantage that this type of connection offers over the type disclosed in Fig. 1 is that the direct current losses can be kept low.

Figure 5:
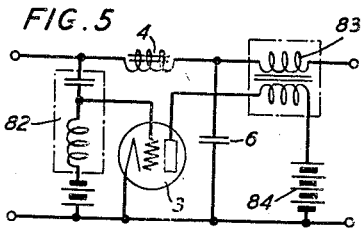
Figure 6:
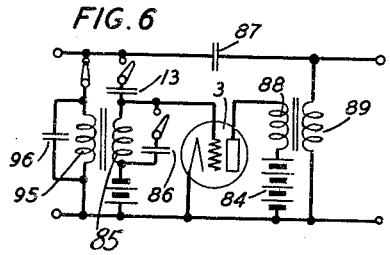

Fig. 5 represents an elemental type of low-pass filter and Fig. 6 an elemental type of high-pass filter each including a tube as the filtering element. In Fig. 5 the tube output coupling is in series with the line whereas in Fig. 6 it is in shunt to the line. Analogously the grid circuit could be in series or in shunt with the line, only the shunt type of coupling being illustrated. In Fig. 6 coil 85 may be coupled to coil 95 connected across the line, shunted by condenser 96 (switches in positions shown) or coil 85 may be shunted by condenser 86 and connected across the line in series with condenser 13 (switches in their alternate positions). The points of coupling between the input and output circuits of the filtering tube 3 and the line are separated in Figs. 5 and 6 by only one filtering element or filter section, but it is to be understood that these couplings may be separated by more than a single filter section, if desired. The coupling elements themselves as, for example, in Fig. 5, where they are shown within the rectangles 82 and 83 may be made in the form of networks of any suitable and desired characteristics for the purpose of amplifying certain ranges or suppressing certain ranges of frequencies. In Fig. 6 a condenser 86 is shown which may be proportioned to anti-resonate with inductance 85 to aid in suppressing a desired range of frequencies.

In each of the modifications shown in Figs. 3 to 6, inclusive, the grid of the tube 3 instead of being coupled as shown through condenser 13 to the upper conductor of the line, may be connected as shown in Fig. 1 through condenser 13 to a point between resistances 11 and 12 which are then placed across one or more series filtering elements in the upper line conductor.

It is understood that various modifications within the scope of the appended claims may be made without departing from the spirit of the invention.

What is claimed is:

1. In a filtering circuit, a line having series and shunt filtering elements including a grid controlled space discharge tube whose space path impedance is effectively shunted across the line, input and output terminals for said filter, impedances connecting said grid to receive voltage variations appearing across both the input and the output terminals of said filter, said grid producing impedance changes in the space path of said tube in correspondence with said voltage variations for variably shunting current from the line to reduce the voltage fluctuations appearing across said output terminals.

2. A filter circuit having impedance in series with a line and impedance in shunt to the line and input and output terminals, a source of current to be filtered connected to the input terminals, a load circuit connected to the output terminals, a grid controlled space discharge device having its space path impedance connected in shunt relation to said line and having connections from its grid to both an input terminal and an output terminal of said filter whereby the shunting effect of said device on current passing through the filter is controlled by voltage variations on both the input and output sides of said filter.

3. In combination, a source of fluctuating voltage, a filtering circuit for suppressing the fluctuations from said source, a plurality of load circuits connected in common to said filtering circuit, said load circuits tending to interact by transfer of voltage fluctuations from one to another through said filtering circuit, said filtering circuit comprising a space discharge tube with a control element controlling its impedance in accordance with fluctuations to be suppressed, and circuit connections for impressing on said control element fluctuations from said source and fluctuations from said load circuits.

4. In combination, a source of fluctuating voltage, a plurality of load circuits to be supplied therefrom, a filter circuit connected between said source and said load circuits, including a space discharge tube having its cathode-anode impedance connected in shunt across said filter circuit, and connections for impressing on the control element of said tube voltage variations from said source and voltage variations reacting on said filter circuit from said load circuits, whereby said filter circuit effectively suppresses both mentioned voltage variations.

5. In a filtering circuit having input terminals and output terminals, for connection respectively to a source of voltage to be filtered and to a load circuit, series and shunt filtering impedances in said filtering circuit, a space discharge tube having its cathode-anode impedance connected in shunt of the filtering circuit and having a control element connected to be influenced by voltage variations impressed on both the input and the output terminals of the circuit to vary the shunting impedance of said tube in accordance with all of said variations in a compensating direction whereby all of said variations are effectively suppressed.

6. In a filtering circuit having input terminals and output terminals, for connection respectively to a source of voltage to be filtered and to a load circuit, a space discharge tube having its cathode-anode impedance connected in shunt of the circuit and a control element connected to receive voltage variations from both an input and an output terminal of the filtering circuit, said control element operating to vary the impedance of the tube in a manner to suppress said variations, and a second load circuit connected across the cathode and anode of said tube.

7. A combination according to claim 6, in which the first mentioned load is the plate circuit of one stage of a multi-stage amplifier and the second load is the plate circuit of an earlier stage of said amplifier.

8. In a filter, a circuit having in series in one side of the circuit impedances in parallel, a shunt impedance element across the circuit at a point between the terminals of one of said parallel impedances, the shunt impedance element including the cathode-anode impedance of a space discharge device, the grid of which device is connected to a second of said parallel impedances at a point between the ends thereof.

EVERETT T. BURTON.